United States Patent
Chen et al.

(10) Patent No.: US 11,184,100 B2
(45) Date of Patent: Nov. 23, 2021

(54) NARROW BAND INTERNET OF THINGS COMMUNICATIONS OVER A SATELLITE COMMUNICATION SYSTEM

(71) Applicants: Liping Chen, Bethesda, MD (US); Lin-Nan Lee, Potomac, MD (US)

(72) Inventors: Liping Chen, Bethesda, MD (US); Lin-Nan Lee, Potomac, MD (US)

(73) Assignee: Hughes Network Systems, Germantown, MD (US)

( * ) Notice: Subject to any disclaimer, the term of this patent is extended or adjusted under 35 U.S.C. 154(b) by 0 days.

(21) Appl. No.: 16/534,807

(22) Filed: Aug. 7, 2019

(65) Prior Publication Data

US 2021/0044371 A1    Feb. 11, 2021

(51) Int. Cl.
| | |
|---|---|
| *H04J 13/00* | (2011.01) |
| *G01S 19/01* | (2010.01) |
| *H04L 5/00* | (2006.01) |
| *H04W 56/00* | (2009.01) |

(52) U.S. Cl.
CPC .......... *H04J 13/0003* (2013.01); *G01S 19/01* (2013.01); *H04L 5/0044* (2013.01); *H04W 56/006* (2013.01); *H04W 56/0035* (2013.01)

(58) Field of Classification Search
CPC ............. H04B 7/18513; H04J 13/0003; H04L 5/0044; G01S 19/01; H04W 56/0035; H04W 56/006
See application file for complete search history.

(56) References Cited

U.S. PATENT DOCUMENTS

| | | | | |
|---|---|---|---|---|
| 5,179,555 | A * | 1/1993 | Videlock | H04L 12/4625 370/402 |
| 10,554,293 | B1 * | 2/2020 | Chin | H04W 56/0065 |
| 10,555,219 | B1 * | 2/2020 | Sethi | H04W 28/20 |
| 2016/0198482 | A1 * | 7/2016 | Kimura | H04W 72/0406 370/329 |
| 2016/0316490 | A1 * | 10/2016 | Wang | H04W 74/0833 |

(Continued)

OTHER PUBLICATIONS

Becker Neal et al.: "Asynchronous Scrambled Coded Multiple Access (A-SCMA)—A New High Efficiency Random Access Method", 2016 IEEE 84th Vehicular Technology Conference (VTC-Fall), IEEE, Sep. 18, 2016 (Sep. 18, 2016) (Year: 2016).*

(Continued)

*Primary Examiner* — Elton Williams
(74) *Attorney, Agent, or Firm* — Capitol City Techlaw; Jasbir Singh (57) ABSTRACT

A user terminal (UT) to transmit small amounts of data, the UT including: a packet including the data, where the packet is less than 128 bytes; a frequency synchronizer to synchronize a transmission frequency of an ASCMA return link connecting the UT with a satellite gateway; and an ASCMA transmitter to transmit, without acquiring timing synchronization with the satellite gateway from the UT, the packet modulated over the synchronized transmission frequency as an ASCMA waveform including a preamble to indicate a start of a transmission. Other embodiments of this aspect include corresponding computer systems, apparatus, and computer programs recorded on one or more computer storage devices, each configured to perform the actions of the methods.

20 Claims, 5 Drawing Sheets

(56) References Cited

U.S. PATENT DOCUMENTS

2017/0150528 A1* 5/2017 Becker .................. H04L 1/005
2017/0366251 A1 12/2017 Ravishankar et al.

OTHER PUBLICATIONS

Mustafa Eroz, Asynchronous Scrambled Coded Multiple Access (A-SCMA), Apr. 2017, 3GPP TSG RAN WG1 Meeting #88bis, R1-1704818, pp. 1-3 (Year: 2017).*

Becker Neal et al: "Asynchronous Scrambled Coded Multiple Access (A-SCMA)—A New High Efficiency Random Access Method", 2016 IEEE 84th Vehicular Technology Conference (VTC-Fall), IEEE, Sep. 18, 2016 (Sep. 18, 2016), pp. 1-6, XP033078746, DOI: 10.1109/VTCFALL.2016.7880912 [retrieved on Mar. 17, 2017].

International Search Report for PCT/US2020/044820 dated Nov. 20, 2020.

Lee Lin-Nan et al: "Scrambled Coded Multiple Access, Variations and Improvements", 2018 IEEE Global Communications Conference (GLOBECOM), IEEE, Dec. 9, 2018 (Dec. 9, 2018), pp. 1-7, XP033519917, DOI: 10.1109/GL000M.2018.8647757 [retrieved on Feb. 20, 2019].

Zhang Jinfang et al: "PoC of SCMA-Based Uplink Grant-Free Transmission in UCNC for 5G", IEEE Journal on Selected Areas in Communications, IEEE Service Center, Piscataway, US, vol. 35, No. 6, Jun. 1, 2017 (Jun. 1, 2017), pp. 1353-1362, XP011651305, ISSN: 0733-8716, DOI: 10.1109/JSAC.2017.2687218 [retrieved an Jun. 2, 2017].

* cited by examiner

| TX Mode | mod | Symbol length | UW length | Pilot space | Sym number | Spectrum BW (KHz) | Duration (ms) | Spread factor | Total TX duration (ms) | Diff SNR from best link |
|---|---|---|---|---|---|---|---|---|---|---|
| 0 | QPSK | 2880 | 128 | 6 | 3488 | 180 | 20 | 1 | 20 | 0 |
| 1 | QPSK | 2880 | 128 | 6 | 3488 | 180 | 20 | 2 | 40 | -3 |
| 2 | QPSK | 2880 | 128 | 6 | 3488 | 180 | 20 | 4 | 80 | -6 |
| 3 | QPSK | 2880 | 128 | 6 | 3488 | 180 | 20 | 8 | 160 | -9 |
| 4 | BPSK | 5760 | 256 | 6 | 6976 | 180 | 39 | 8 | 312 | -12 |
| 5 | BPSK | 5760 | 256 | 6 | 6976 | 90 | 78 | 8 | 624 | -15 |

FIG. 6

NARROW BAND INTERNET OF THINGS COMMUNICATIONS OVER A SATELLITE COMMUNICATION SYSTEM

FIELD

A system and method of Narrow Band Internet of Things (NB-IoT) optimized for satellite-based communication system.

BACKGROUND

Terrestrial wireless NB-IoT cannot cover the world as needed by IoT devices. As such, there is a need for connect IoT applications through satellite-based wireless NB-IoT solutions rather than terrestrial NB-IoT. Moreover, conveying a terrestrial NB-IOT signal via a satellite link, even with appropriate frequency translation to the satellite band, is unworkable:

Due to the large coverage of a satellite beam, as compared to the coverage of a terrestrial cellular base stations, Due to the large distance the signal has to travel through (from ground to satellite and from satellite back to the ground), and Due to the signal strength attenuation associated with the large distance.

3GPP Narrowband-IoT (NB-IoT) is a 3rd Generation Partnership Project (3GPP) wireless standard for terrestrial Low Power Wide Area (LPWA) networks. 3GPP NB-IoT provides a downlink speed of 250 kilobits per second (kbps), an uplink speed of 50 kbps, a relaxed latency of up to 10 seconds, a maximum distance from a UE to an eNodeB antenna is 100 km or less having a maximum Round Trip-Time (RTT) of 67 microseconds (us), a stationary eNodeB antenna and a UT antenna that may be mobile. Moreover, 3GPP NB-IoT provides a +20 dB link margin over GSM and LTE, and IP Data over the control plane. The 3GPP NB-IoT radio protocol is inoperative when the RTT is greater than 67 microseconds due at least in part to the significantly more signal propagation delay and/or frequency Doppler shifts experienced due to relaying a signal, for example, when the signal is relayed by a satellite or a high attitude platform.

A satellite-based NB-IoT needs to work with a large cell size (beam coverage area) as compared to a standard 3GPP NB-IoT. Further, a satellite-based NB-IoT has a much larger differential RTT than the standard 3GPP NB-IoT. The larger latency means that various timers, such as, the RRC timers (T300, T301 or the like), a RAR time window size, a Contention Resolution window size, a Timing Advance, and a HARQ process number (=RTT/TTI) need to be adjusted to account for a satellite RTT that is much greater than the standard LTE RTT. The 3GPP NB-IoT UE has only one (release 13) or two (release 14) HARQ processes for both UL and DL (rel13), whose timers limit UE peak data rate. Moreover, a gateway HARQ process number would be very large if the 3GPP NB-IoT (due in part to the long RTT) is deployed over satellite (in order to keep a high peak data rate in the satellite communication system).

Additionally, the standard LTE NB-IoT does not deal effectively with the Doppler effect satellite-based NB-IoT suffers from due to many reasons. For example, a 3.75 Khz Sub Carrier Spacing (SCS) is more sensitive to the Doppler effect, and a differential Doppler and Carrier Frequency Offset among users which can cause more ACI.

A longer RTT implies a longer wake-up duration to perform the access procedure and data transmission. This leads to a shorter battery life due to more power consumption and/or repeated transmission to close a link.

The current 3GPP NB-IoT uplink is not spectrum efficient for small data transmission. For example, to send 80 bytes return uplink short data packet 20 total messages are communicated back and forth between a gateway and a UE.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a satellite communication network and satellite NB-IoT devices. The NB-IoT devices may directly communicate via satellite based NB-IoT, may act a relay to convey a terrestrial NB-IoT signal (for example, the 3GPP standard compliant NB-IoT signal), or may perform both types of communications. The NB-IoT devices may include type I, II and III devices. In the present teachings, a type IV NB-IoT device is a standard NB-IoT.

The present teachings use "grant free" random access where a UT transmits only when there is data to transmit and the UT transmits without acquiring timing synchronization with the satellite gateway from the UT. With grant free random access, no advance scheduling or request-grant process such as a feedback based dynamic allocation from the satellite gateway is needed. ASCMA provides grant free random access and may be used by a Type I, II or III UT to transmit to the satellite. In grant free random access, it is possible that sometimes zero, only one or multiple UTs may be transmitting. Even though ASCMA does not play a role when zero or one UT is transmitting, the one UT must transmit using the ASCMA format, as the UT has no knowledge as to a transmission state of other UTs.

LTE NB-IoT needs to be adapted for satellite system's higher latency, for example, a GEO satellite has a 240-280 millisecond (ms) one-way satellite delay or a 480-560 ms round trip delay. In some embodiments, a satellite beam center timing and doppler frequency offset may be broadcast in the system information blocks. In some embodiments, throughput performance over the satellite may be improved by disabling Hybrid Automatic Repeat reQuest (HARM) in satellite NB-IoT. In some embodiments, the present teachings provide a gateway between the 3GPP NB-IoT waveform and an ASCMA waveform that is more suitable for satellite communications. In some embodiments, the present teachings provide an ability for a device (for example, an IoT device) sending small packets to communicate via a satellite to a desired destination over the internet, for example, when terrestrial communications are unavailable to the device.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a user terminal (UT) to transmit small amounts of data, the UT including: a packet including the data, where the packet is less than 128 bytes; a frequency synchronizer to synchronize a transmission frequency of an ASCMA return link connecting the UT with a satellite gateway; and an ASCMA transmitter to transmit, without acquiring timing synchronization with the satellite gateway from the UT, the packet modulated over the synchronized transmission frequency as an ASCMA waveform including a preamble to indicate a start of a transmission. Other embodiments of this aspect include corresponding computer systems, apparatus, and computer programs recorded on one or more computer storage devices, each configured to perform the actions of the methods.

Implementations may include one or more of the following features. The UT further including a sensor to produce the data and an IP stack to packetize the data for transmission to the satellite gateway by adding a destination address to the packet. The UT further including a forward link receiver to receive information from the satellite gateway, where the information includes the preamble, a beam center frequency offset, guidance for a transmission mode, and a waveform repeat count. The UT further including a forward link receiver to receive information from the satellite gateway, where the information includes a reference RSRP, a beam center doppler, a beam center TA, guidance for a transmission mode per the reference RSRP. The UT further including a GNSS to produce a location for the UT, where the frequency synchronizer compensates for a doppler shift based on the location. The UT further including a NB-IoT hub to operate as a standard NB-IoT base station for a standard NB-IoT device, to receive and packetize a standard NB-IoT waveform from the standard NB-IoT device, and to send the packetized communication via the ASCMA transmitter to the satellite gateway. The UT further including a forward link receiver to receive information from the satellite gateway, to packetize the information from the satellite gateway, and to send the packetized information via the standard NB-IoT base to the standard NB-IoT device as a standard NB-IoT waveform. The UT further including a short-range transceiver to communicate with a local device. The UT further including a short-range transceiver to receive initialization and configuration information for communicating over the ASCMA return link. Implementations of the described techniques may include hardware, a method or process, or computer software on a computer-accessible medium.

One general aspect includes a method for transmitting small amounts of data from a user terminal (UT), the method including: providing a packet including the data, where the packet is less than 128 bytes; synchronizing a transmission frequency of an ASCMA return link connecting the UT with a satellite gateway; and transmitting, without acquiring timing synchronization with the satellite gateway from the UT, the packet modulated over the synchronized transmission frequency as an ASCMA waveform including a preamble to indicate a start of a transmission. Other embodiments of this aspect include corresponding computer systems, apparatus, and computer programs recorded on one or more computer storage devices, each configured to perform the actions of the methods.

One general aspect includes a system to transmit small amounts of data, the system including: a satellite gateway; and a plurality of user terminals (UTs), each UT including: a packet including the data, where the packet is less than 128 bytes, a frequency synchronizer to synchronize a transmission frequency of an ASCMA return link connecting the UT with the satellite gateway, and an ASCMA transmitter to transmit the packet as a transmission via the ASCMA return link as an ASCMA waveform without acquiring timing synchronization with the satellite gateway. In the system the satellite gateway is configured to receive at least two of the transmissions, the at least two of the transmissions are received by the satellite gateway at least partially concurrently, and the satellite gateway is configured to separate each of the at least two of the transmissions and to recover the respective packet from each of the at least two of the transmissions.

Implementations may include one or more of the following features. The system where the packet includes a destination address, and the satellite gateway is configured to extract the destination address from the respective packet and forward the data in the packet to the destination address. The system where the satellite gateway determines guidance for a transmission mode of the UTs in the coverage area per the reference RSRP. The system where the satellite gateway provides, to the plurality of UTs, initialization and configuration information for communicating over the ASCMA return link. The system further including a reference UT in a coverage area of the ASCMA return link, where the reference UT reports to the satellite gateway a reference RSRP. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to providing NB-IoT over a satellite link.

Terminology

3GPP: The 3$^{rd}$ Generation Partnership Project
ACI: Adjacent Channel Interference
ASCMA: Asynchronous Scrambled Coded Multiple Access
CSI: Channel State Information
eNodeB: E-UTRAN Node B
Forward or Down Link: from GW to UT
GNSS: Global Navigation Satellite System
GSM: Global System for Mobile Communication
GW: Gateway
HARQ: Hybrid Automatic Repeat Request
LTE: Long-Term Evolution
NB-IoT: Narrow Band Internet of Things
NBRACH: Narrow Band Random Access Channel
QPSK: Quadrature Phase-Shift Keying
RA: Random Access
RAR: Random Access Response
Return or Up Link: from UE to GW
RRC: Radio Resource Control
RSRP: Reference Signal Receiving Power
RTT: Round Trip Time
SCMA: Scrambled Coded Multiple Access
SCS: Subcarrier Spacing
TA: Timing Advance
TTI: Transmission Time Interval
UT: User Terminal

Overview

The present teachings describe a spectrum efficient NB-IoT over satellite return link waveform. In some embodiments, SCMA (Synchronous or Asynchronous) can provide NB-IoT over satellite. Asynchronous random access for a UE may be provided by SCMA without use of return link timing synchronization when using ASCMA. Non-orthogonal multiple access provided by SCMA may replace NBRACH& short data transmission to provide reduced latency in the satellite communication system, reduced protocol overhead, reduced power consumption and improved spectrum efficiency.

In exemplary embodiments, ASCMA's aggregated spectrum efficiency is equivalent to QPSK. In exemplary embodiments, properties of an ASCMA waveform for short data transmission may include deliver 80 bytes data with 1/9 LDPC coding, QPSK or BPSK modulation, a preamble of 128 or 256 symbols, a Poisson arrival rate or average load of about 12 users, and an operational signal-to-noise ratio (SNR) of about 3-4 dB. ASCMA's performance is usually limited by interference and is not sensitive to SNR changes. As such, ASCMA is tolerant of channel status feedback inaccuracy and delay in satellite system.

Exemplary uses of NB-IoT include: Temperature (8 bits), Door open and close status (Alarm System, open/close, 1 bit), Gas Meter (2 bytes), Water Meter (2 bytes), Street lights (on/off, 1 bit), People/animal Tracking (position, latitude, longitude, 4 bytes), Parking (on/off, 1 bit).

Exemplary UTs may be viewed as type I, type II and type III and are described herein. Features of the various UT types are summarized in the table below.

|  | Type I | Type II | Type III |
| --- | --- | --- | --- |
| Standalone | Yes | Yes | No |
| With Hub/Relay | No | No | Yes |
| With satellite forward link receiver | Yes | No | No |
| GNSS | Optional | Required | Optional |
| Short range Wireless capability | NO | Yes | Yes |
| Can be reference UT | No | No | Yes |
| Mobility | Yes with GNSS | Yes with GNSS | No |
| Exemplary Embodiment | UT 106 or UT 204 | UT 108 or UT 202 | UT 110 or UT 206 |

Figure 1:
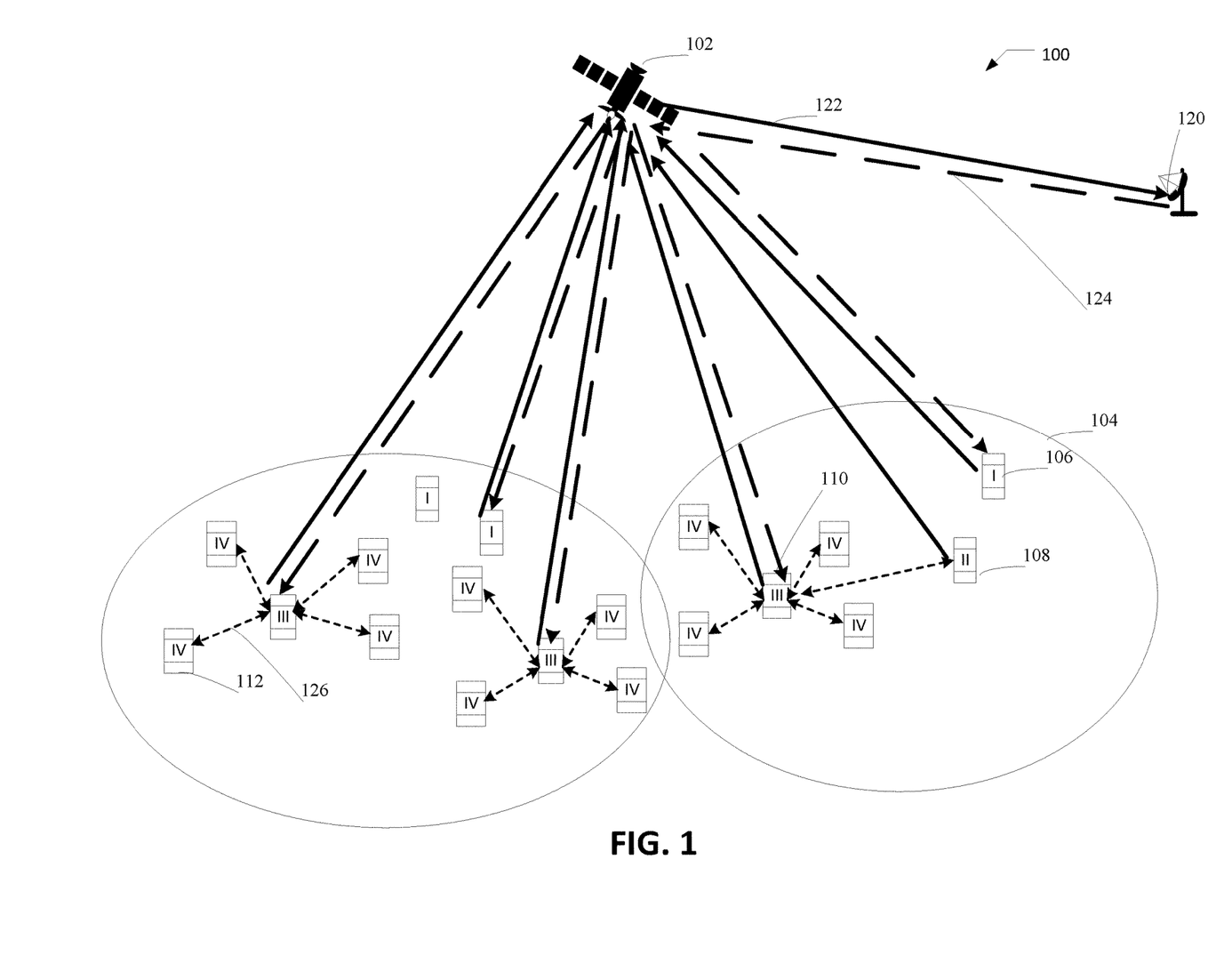
FIG. 1 illustrates an exemplary high-latency bandwidth network system.

FIG. 1 illustrates a NB-IoT system providing cell coverage with a satellite according to various embodiments.

FIG. 1 illustrates a NB-IoT system 100 providing cell coverage of an area 104 with a satellite 102 according to various embodiments. The system can include one or more of a type I UT 106, a type II UT 108, a type III UT 110 and a type IV UT 112. A return link 122 from the type I UT 106, the type II UT 108 or the type III UT 110 may be relayed by the satellite 102 to a gateway 120. The return link 122 uses an SCMA or ASCMA waveform to convey an NB-IoT waveform to the gateway 120. A forward link 124 from the gateway 120 to the type I UT 106, or the type III UT 110 may be relayed by the satellite 102. The forward link 124 uses one of the prior art satellite waveforms for example MF TDMA to convey information from the gateway 120.

The type I UT 106 may be a standalone UT which has mobility and uses only a satellite connection. The type I UT 106 may include a directional antenna to provide both a return link and forward link satellite connections. The type I UT 106 may include GNSS, a battery, a solar panel, and/or a memory. The type I UT 106 may use an ASCMA transmission waveform for the return link.

The type II UT 108 may be a standalone UT which has mobility and can use a satellite connection in conjunction with a local wireless (for example, Wi-Fi, Bluetooth or IEEE 802.15.4) connection. The type II UT 108 may use Wi-Fi or Bluetooth for a short range IoT connection whenever connection is available. The Wi-Fi or Bluetooth connection is used for power up system initialization or later configuration updates, e.g. predefined frequency band modification for return satellite transmission to balance load over the satellite return channel. The or Bluetooth connection always have priority over the satellite connection to preserve power. The type II UT 108 may use an ASCMA transmission waveform for the return link satellite transmission when there is no other connectivity to an external network (for example, Internet) via a Wi-Fi or Bluetooth connection. The type II UT 108 may not include a satellite receiver and thus cannot receive the forward link. The type II UT 108 may include an omnidirectional antenna to communicate via the satellite over a robust frequency band, for example, over the S band. The type II UT 108 may include a unidirectional RF front end to communicate via a satellite over a frequency band, for example, over the Ka band.

The type III UT 110 may be a relay node for an NB-IoT UT, for example, the type II UT 108, the type IV UT 112. The type III UT 110 may operate as a relay for one or more UT's in the vicinity. In some embodiments, the type III UT 110 may have no mobility. The type III UT 110 may have a good return link (UL) and/or forward link (DL) budget. In some embodiments, the type III UT 110 may include a GNSS, a battery and a solar panel. The type III UT may use an ASCMA transmission waveform for the return link. A NB-IoT hub including an NB-IoT base may be included and may be either built-in or be a separate unit in the type III UT110. The type III UT 110 may serve as a reference UT to give guidance for a transmission of a standalone UT, for example, the type I UT 106 and type III 110. In some embodiments, the type III UT 110 at beam center may provide feedback to GW about reference beam center residual Doppler shift, a transmission power level paired with its RSRP.

The type IV UT 112 may be a terrestrial UT. The type IV UT 112 may be a standard 3GPP NB-IoT capable device that may be capable of operating with deep fading when placed indoors. The type IV UT 112 may include a GNSS, a battery and a solar panel. The type IV UT 112 may have limited mobility. The type IV UT 112 may be a standard short-range NB-IoT terminal that follows one or more LTE and 3GPP standards. The type IV UT 112 is not capable of communicating via an ASCMA transmission waveform. The type IV UT 112 may communicate with a NB-IoT standard compliant base such as the type III relay 110 via a NB-IoT standard compliant waveform 126.

The type II UT 108, type III UT 110, type IV UT 112 may include a Wi-Fi or Bluetooth short-range communication interface.

A UT may include GNSS for finer location and positioning of location tracking services, for example, human and animal tracking services. GNSS may assist in handover between beams when there is a relative movement between the UT and the satellite. With GNSS, Doppler shift frequency can be measured and compensated by a frequency synchronizer included in a UT's receiver. In other embodiments, GNSS may be used to compensate for a MEO and LEO satellite movement caused Doppler Effect.

An optional reference UT may help to improve quality of service of other NB-IoT devices. The reference UT may measure and report local Doppler shift due to satellite movement to a satellite gateway. The satellite gateway may broadcast Doppler frequency compensation to all UT's communicating via the beam. In some embodiments, the reference UT may measure and report link quality to the satellite gateway. For every beam the satellite gateway may analyze the statistics reported by the reference UT, and subsequently broadcast guidance for the UT's transmission over the ASCMA return link including modulation, subcarrier number, repetition number and the like. A UT with a forward link receiver, for example, the standalone UT 106 or the relay UT 110 may be used as a reference UT.

A satellite link power control for a UT may be provided. In some embodiments, when the return and forward link radio carrier frequencies are close (for example, when both are in the S-band) open loop power control may be used by estimating the UT's forward link signal level. A UT with a forward link receiver, for example, the standalone UT 204 or the relay UT 206 may use an open loop power control that depends on RSRP. In some embodiments, a UT may use a closed loop power control that depends on receiver SNR measurement and feedback report. In some embodiments, and the return forward link radio carrier frequencies not close (for example, return link in Ka band and forward link in Ku band), an open loop power control may not be sufficient and a closed power loop control may be needed. When a UT does not include a forward link receiver the UT may transmit with a maximum power transmission.

A UT with limited mobility may include a return frequency synchronizer while not including GNSS. In some embodiments, a gateway may broadcast a beam center frequency offset of the return beam. For example, the type I UT 106 may use beam center doppler frequency offset to compensate for the Doppler frequency shift. In some embodiments, a return beam center frequency offset may be based on a forward beam center frequency offset used by the forward link receiver.

Figure 2A:
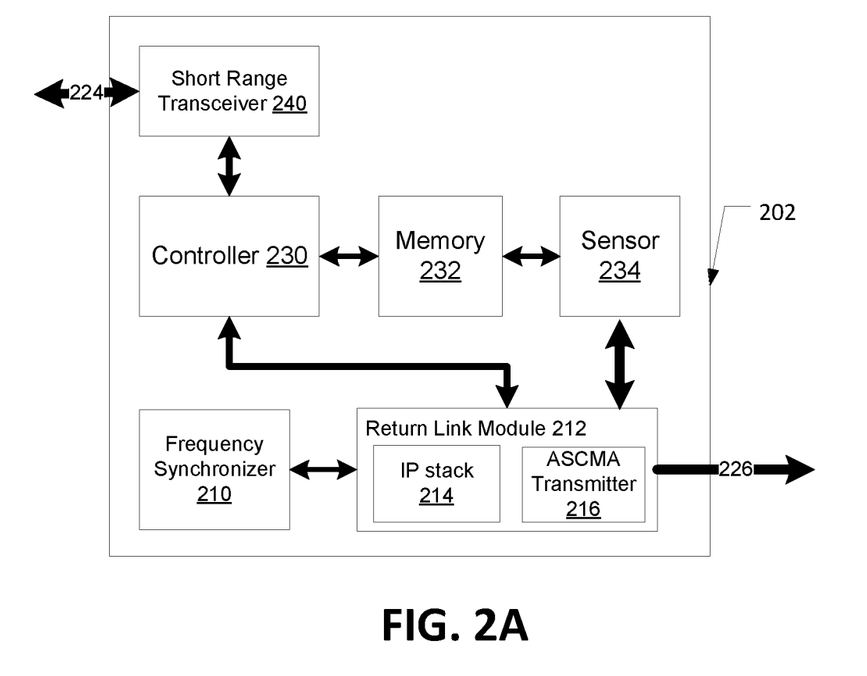
FIG. 2A illustrates a block diagram of a standalone UT (type II) according to various embodiments.
Figure 2B:
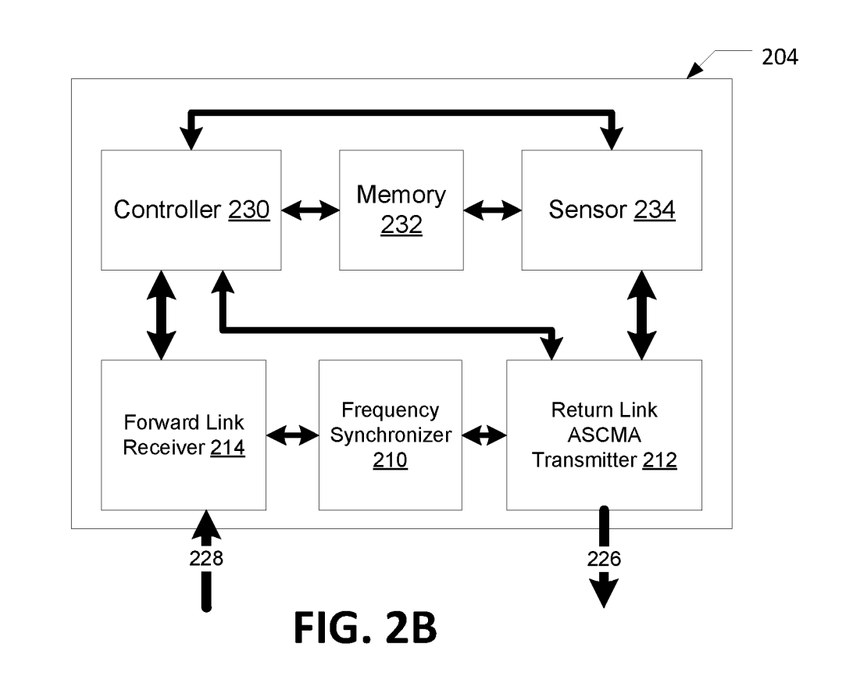
FIG. 2B illustrates a block diagram of a standalone UT (type I) according to various embodiments.
Figure 2C:
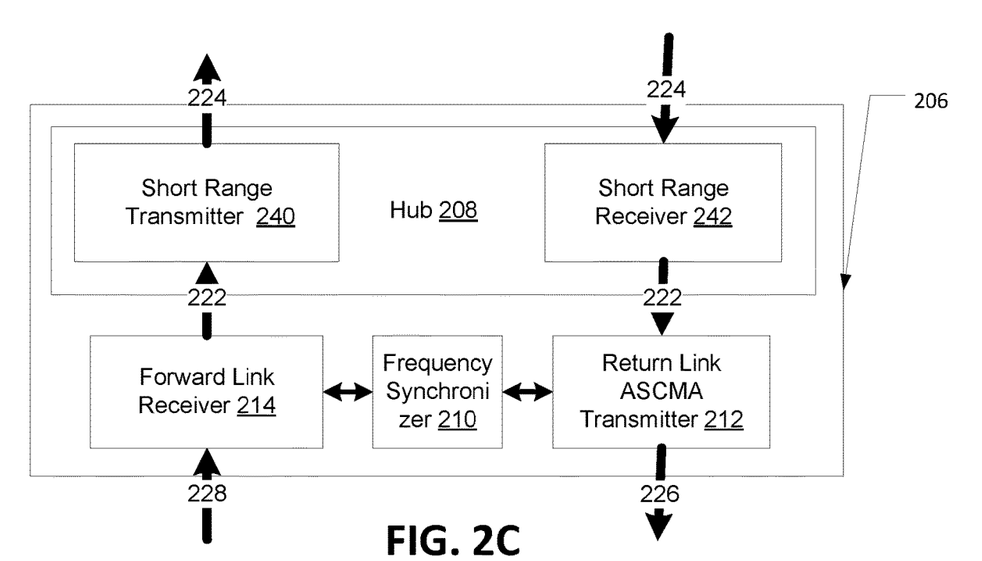
FIG. 2C illustrates a block diagram of a relay UT (type III) according to various embodiments.

FIG. 2A illustrates a block diagram of a standalone UT (type II) according to various embodiments.

A standalone type II UT 202 may include a short-range transceiver 240, a controller 230, a memory 232, a sensor 234, a frequency synchronizer 210 and a return link module 212. The standalone type II UT 202 may provide a unidirectional satellite communication link from the sensor 234 to the gateway. The sensor 234 may connect to the type II UT 202 over a wireless connection. The standalone type II UT 202 may forward information from the sensor 234 over the return link module 212 to the gateway (not shown). In some embodiments the standalone type II UT 202 may forward information received over the short-range transceiver 240 over the return link module 212 to the gateway.

FIG. 2B illustrates a block diagram of a standalone UT (type I) according to various embodiments.

A standalone type I UT 204 may include the controller 230, the memory 232, the sensor 234, the frequency synchronizer 210, the forward link receiver 214 and the return link module 212. The forward link receiver 214 may receive transmissions from a satellite or a relay using industry a satellite communication waveform 228. The received transmissions may be used to program or configure sensor 234. The standalone type I UT 204 may provide a bidirectional communication link between the sensor 234 and the gateway. The sensor 234 may connect to the type I UT 204 over a wireless connection.

FIG. 2C illustrates a block diagram of a relay UT (type III) according to various embodiments.

A relay type III UT 206 may include the short-range transceiver 240, the controller 230, the memory 232, the frequency synchronizer 210, the forward link receiver 214 and the return link module 212. The relay type III UT 206 may include a hub 208. The hub 208 may include a processor and a memory (not shown). The hub 208 may provide bidirectional communication to the gateway. In some embodiments. the relay type III UT 206 may forward information received over the short-range transceiver 240 via the return link module 212 to the gateway.

The short-range transceiver 240 may operate as industry-standard short-range radios (such as, Bluetooth, Wi-Fi, or the like) using an over the air medium 224 (such as, RF, laser, infrared or the like). The short-range transceiver 240 may packetize information using an industry standard protocol such as UDP/IP. The controller 230 may be a custom chip or an off-the-shelf CPU. The memory 232 may include persistent or non-persistent memory storage. The sensor 234 may include an Internet of things sensor, for example, as discussed previously. The frequency synchronizer 210 may include a GNSS (not shown) to provide a location of the UT 202 to the controller 230 by provisioning, by using a GPS sensor, by reading data from a persistent memory, or the like. The return link module 212 converts information from the controller to an ASCMA waveform 226 and transmits it to the gateway (not shown) via a relay (not shown) like a satellite.

The short-range transceiver 240 may operate as industry-standard short-range radios (such as, Bluetooth, Wi-Fi, or the like) using an over the air medium 224 (such as, RF, laser, infrared or the like). The short-range transceiver may packetize information using an industry standard protocol such as TCP/IP. The controller 230 may be a custom chip or an off-the-shelf CPU. The memory 232 may include transient or non-transient memory storage. The sensor 234 may include an Internet of things sensor, for example, as discussed previously. The frequency synchronizer 210 may include a GNSS (not shown) to provide a location of the UT 202 to the controller 230 by provisioning, by using a GPS sensor, by reading data provided by a technician, or the like. The return link module 212 converts information from the controller to an ASCMA waveform 226 and transmits it to a gateway (not shown) via a relay (not shown) like a satellite. The forward link receiver 214 may receive transmissions from a satellite or a relay using an industry standard satellite communication waveform 228.

Figure 3:
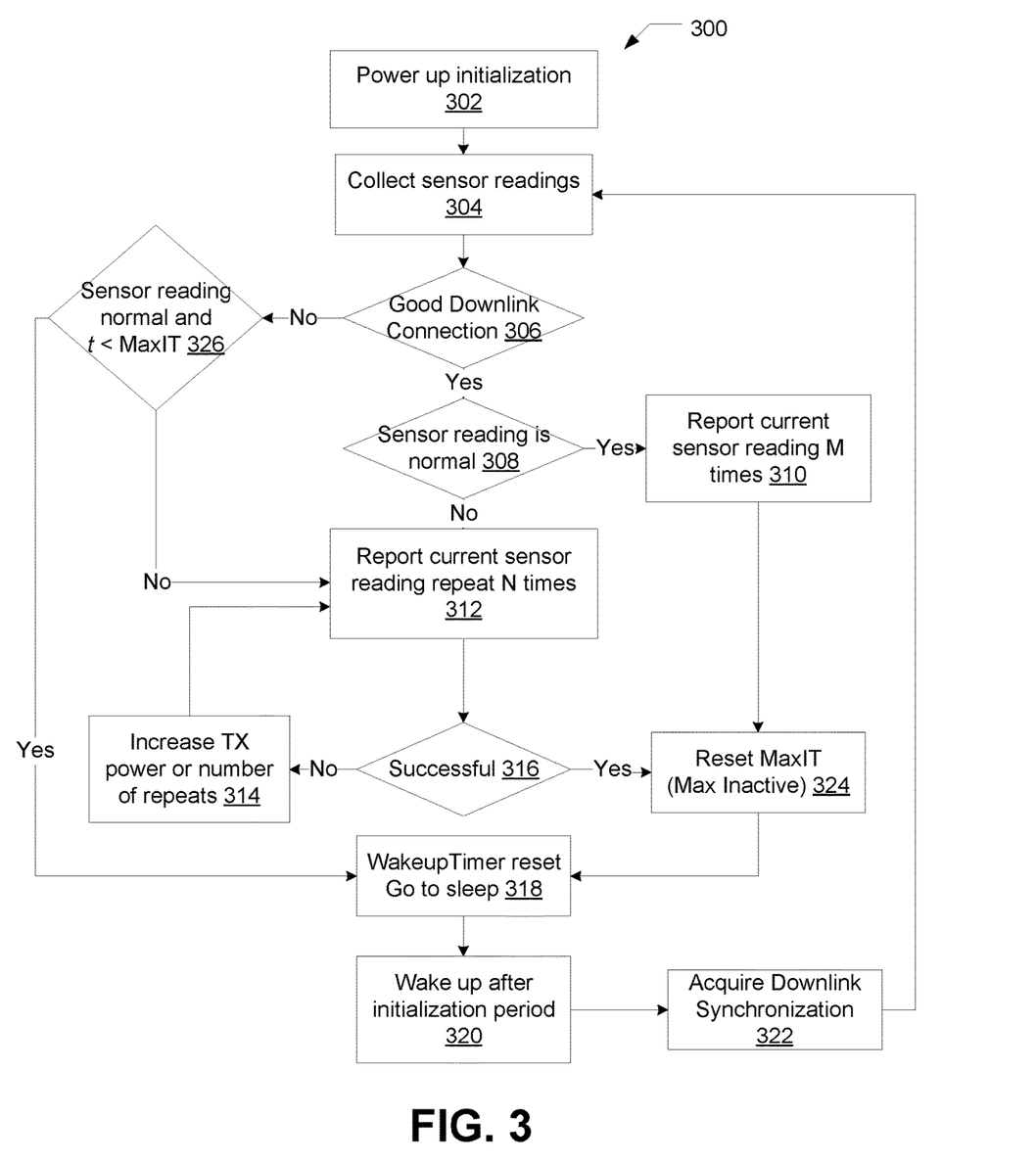
FIG. 3 illustrates a grant free process for communicating information between a standalone UT (type I) and a gateway via a satellite according to various embodiments.

FIG. 3 illustrates a grant free process for communicating information between a standalone UT and a gateway via a satellite according to various embodiments.

A grant free process 300 for communicating information between a standalone UT and a gateway may include power-up initialization 302. In some embodiments, the standalone UT using the process 300 may be a Type I UT 106. After the power up initialization 302, the process 300 may collect sensor readings 304. The process 300 may determine at operation 306 whether there is a good downlink connection to the gateway. When operation 306 determines that there is a good downlink connection, the process 300 may determine whether the sensor reading is normal at operation 308.

When operation 308 determines that the sensor reading is normal, the UT may report the current sensor reading M times at operation 310. When a result of either operation 326 or operation 308 is negative (no), process 300 may report a sensor reading N times at operation 312. When operation 312 is unsuccessful, the process 300 may include operation 314 to try reporting the sensor reading by increasing a transmission power or by increasing N. The process 300 may include operation 324 to reset a maximum inactive timer. Operation 324 may be performed after reporting per operation 310, or after a successful reporting per operation 312. After operation 324, the process 300 may reset a wake-up timer and go to sleep for the duration at operation 318. The process 300 may wake-up after an initialization period at operation 320 and acquire the downlink synchronization at operation 322.

The reporting of operation 310 or 312 may communicate the sensor reading using an ASCMA transmitter. In the process, at least operations 326 and 324 are optional.

Figure 4:
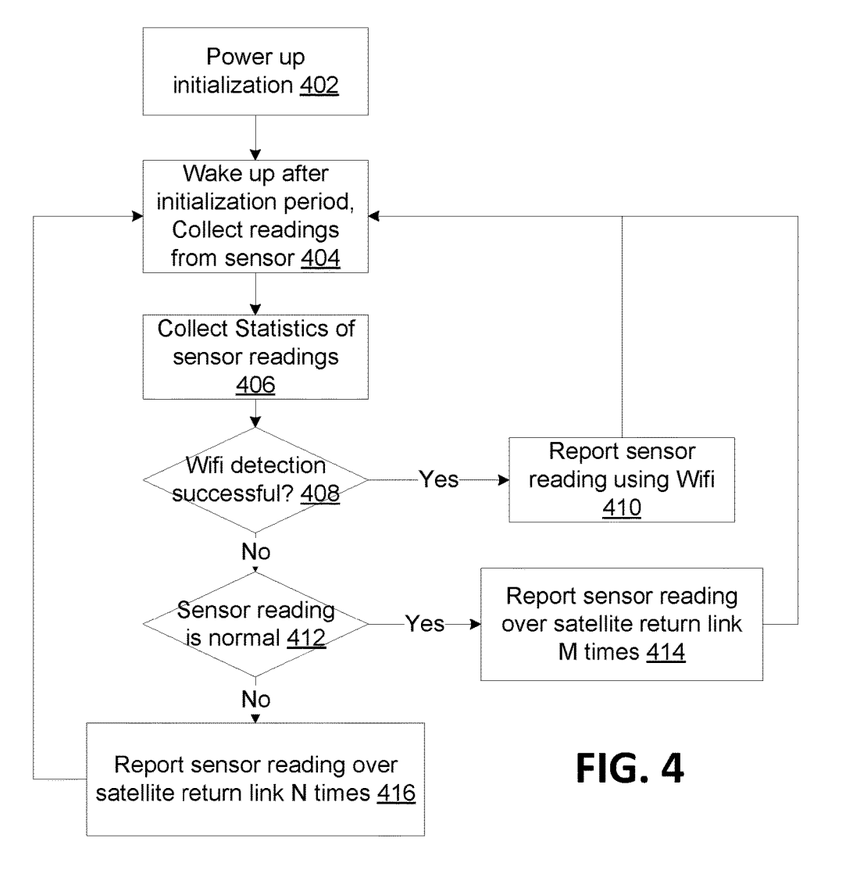
FIG. 4 illustrates a process for optionally communicating information between a standalone UT (type II) and a gateway via a satellite according to various embodiments.

FIG. 4 illustrates a process for optionally communicating information between a standalone UT and a gateway via a satellite according to various embodiments.

A process 400 for optionally communicating information between a standalone UT and a gateway may include power-up initialization 402. In some embodiments, the standalone UT of the process 400 may be a Type II UT 108. After the power up initialization 402, the process 400 may wake-up after an initialization period and collect sensor readings at operation 404. The process 400 may collect statistics of the sensor readings at operation 406. The process 400 may determine at operation 406 whether a Wi-Fi connection capable of connecting to a desired computer is available. When operation 406 determines that there is a Wi-Fi connection, the process 400 may report sensor readings using the Wi-Fi connection at operation 408.

When operation 406 determines that there is no Wi-Fi connection, then the process reports sensor readings via the satellite at operation 412. When operation 412 determines that the sensor reading is normal based on collected statistics, the UT may report the current sensor reading M times at operation 414. When a result of operation 412 is negative (no), process 400 may report a sensor reading N times at operation 416. After operation 410, 414 or 416, the process 400 may reset a wake-up timer and wake-up at operation 404. In some embodiments, the communication over the ASCMA transmitter may be performed without acquiring downlink synchronization as a type II UT may not have receive a satellite forward link for synchronization, In FIG. 3 and FIG. 4, the power-up initialization may include network registration, satellite communication frequency allocation, acquiring downlink synchronization, and receiving various runtime parameters. The runtime parameters may include how often to transmit from the UT to the gateway, a maximum inactive timer, a wake-up timer, or the like. In some embodiments, M may be set as one. The sensor may be an IoT sensor. In some embodiments, N may be greater than 1. Both N and M may be parameters received by the UT at power up initialization. The reporting may include modulating, coding and transmitting the sensor value with an ASCMA waveform. The sensor reading may be included as a payload for a datagram such as an IP datagram. The datagram may include a source address, a destination address, routing information and the like. The acquisition of downlink synchronization may include adjusting a carrier transmission frequency for a Doppler Effect and setting a transmission power level.

The time domain grant free process transmits without collision detection at the transmitter or acquiring timing synchronization with the receiver. In the time domain grant free process, the receiver may detect concurrent transmissions from two or more transmitters. In some embodiments, the receiver may be able to recover data transmitted by the two or more of the concurrent transmissions, for example, when the concurrent transmissions overlap in time but not in a transmission start instant.

Figure 5:
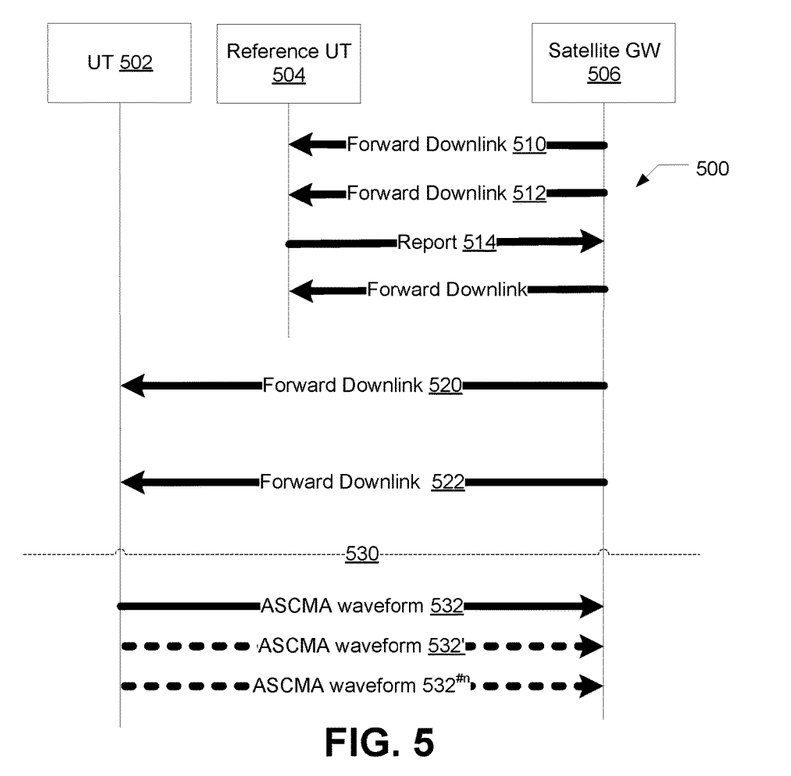
FIG. 5 illustrates a forward and return timing ladder for a UT (optionally including a reference UT) and a satellite gateway according to various embodiments.

FIG. 5 illustrates a forward and return timing ladder for a UT (optionally including a reference UT) and a satellite gateway according to various embodiments.

A forward and return timing ladder 500 between a UT 502 (optionally including a reference UT 504) and a satellite gateway 506 is provided. The reference UT 504 may discover a forward downlink 510 to perform a cell search and selection. The forward downlink 510 may be used to calculate a downlink time and frequency synchronization. Subsequently, the forward downlink 512 may be used to calculate and/or measure a RSRP at the reference UT 504 (RSRP_REF). The forward downlink 512 may be used to calculate and/or measure a Doppler shift. Subsequently the reference UT follow for may report the Doppler and the RSRP_REF to the satellite gateway 506. In some embodiments, the reference UT 504 may report the Doppler and the RSRP_REF per forward or downlink beam. In some embodiments the reference UT 504 may be a reference UT only for one beam.

When the UT 502 (a non-reference UT) needs to communicate with the satellite gateway 502 the UT 502 discover a forward downlink 520 to perform a cell search and selection. The forward downlink 520 may be used to calculate a downlink time and frequency synchronization. Subsequently, the forward downlink 522 may be used to measure and/or calculate a RSRP for the UT 502. The forward downlink 522 may be used for deriving system information including beam center doppler, beam center TA, guidance for transmission mode per the RSRP_REF, or the like at the UT 502. Subsequently, at 530, the UT 502 compares the RSRP and RSRP_REF to decide an TX mode according to the difference between the RSRP and RSR- P_REF, The TX mode is used for an ASCMA waveform 532. In some embodiments, the ASCMA waveform may be repeated n times (determined by the TX mode) as ASCMA waveform 532' and ASCMA waveform 532'''.

In some embodiments, the UT 502 and the reference 504 may support frequency hopping. In some embodiments, when there is no ACK and no CSI feedback from the UT 502, the reference UT 504 may collect the CSI and report the same to the satellite gateway 506. The satellite gateway 506 may broadcast the CSI to share with the satellite NB-IoT UT 502.

In exemplary embodiments return link scheduling may be implemented using grant free timing. The satellite gateway may allocate a different preamble to the UTs. In some embodiments, there may be a one-to-one correspondence between the UT and the preamble. In some embodiments, one preamble may be allocated to multiple UTs. In exemplary embodiments, a satellite NB-IoT return link may be allocated a frequency spectrum, for example, a 180 Khz spectrum. The whole spectrum may be assigned to every UT to reduce transmitter complexity. By assigning the whole spectrum, scheduling overhead for the UT may be reduced and transmission from the UT may be more tolerant to Doppler shifts. In some embodiments, the whole spectrum can be separated into groups of narrower bands to close a link budget. In such embodiments, the groups of narrower bands may change occasionally based on link status feedback and/or traffic load. The spectrum for use by a UT may be broadcast to a UT including a forward link receiver, for example, the standalone UT 204, the relay UT 206.

In embodiments where a forward link receiver is not included in the UT, the UT may transmit with pre-allocated frequency spectrum without acquiring time synchronization.

In one embodiment for type II UT 202, several Frequency band of 180K may be preallocated for use of satellite NB-IoT. The Doppler shift may be detected at the UT and compensated for, and a symbol Rate of less than 180K may be used to allow margin for satellite oscillator inaccuracy. When the frequency band is within the S band and the LO on satellite is 1 Ghz and its accuracy is 4 PPM, the frequency drift could be as big as +/−4 Khz (+/−4 PPM*1G=+/−4 Khz), a maximum symbol rate of (180K−2*4K)/1.1=156 Khz if 10% roll off factor may be used. When the frequency band is within the Ka band and the LO on the satellite is 11 Ghz and its accuracy is 4 PPM (+/−4 PPM*11G=44 Khz), a maximum symbol rate of (180K−2*44K)/1.1=83 Khz if 10% roll off factor may be used. In some embodiments, both the satellite gateway and the UT may use a GPS disciplined local oscillator having a very high accuracy.

Figure 6:
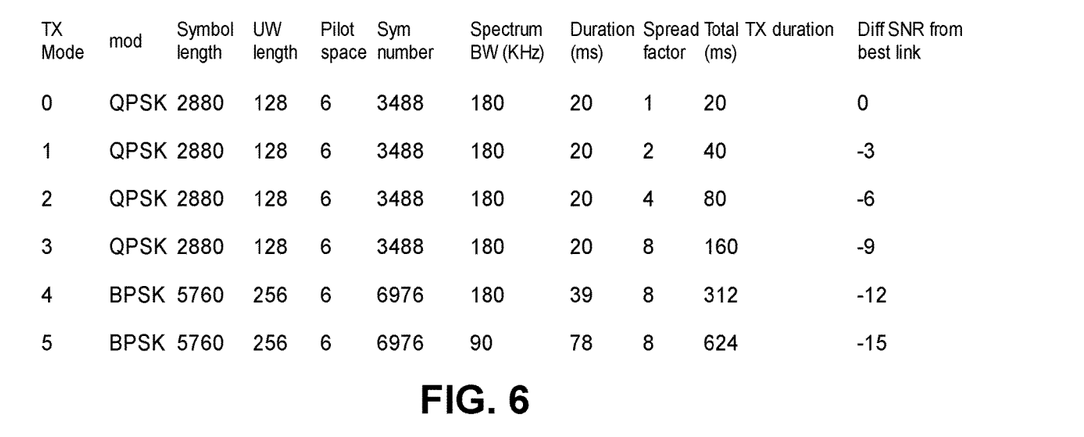
FIG. 6 illustrates an exemplary transmission mode table for transmitting small amounts of data according to various embodiments.

FIG. 6 illustrates an exemplary transmission mode table for transmitting small amounts of data according to various embodiments.

An exemplary transmission mode table for transmitting small amounts of data (80 bytes) at a rate of 1/9 and assuming a clear sky link budget can achieve TX mode 0. In some embodiments, TX mode 3 may provide acceptable performance. A UT's TX_mode may be calculated as:

$$UT\_TX\_mode = \text{Suggested } TX \text{ mode} - \text{floor}((RSRP\_UT - RSRP\_ref)/C\_scale)$$

where C_scale is the conversion scale dependent on implementation of the system, including table granularity, uplink and downlink frequency and channel condition. C_scale can be calibrated by the reference UT and broadcasted by GW to other UTs.

The present teachings may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A User Terminal (UT) to transmit small amounts of data, the UT comprising:
 a packet comprising the data, wherein the packet is less than 128 bytes;
 a frequency synchronizer to synchronize a transmission frequency of an Asynchronous Scrambled Coded Multiple Access (ASCMA) return link connecting the UT with a satellite gateway; and
 an ASCMA transmitter to transmit, without acquiring timing synchronization with the satellite gateway from the UT, the packet modulated over the synchronized transmission frequency as an ASCMA waveform comprising a preamble to indicate a start of a transmission.

2. The UT of claim 1, further comprising a sensor to produce the data and an IP stack to packetize the data for transmission to the satellite gateway by adding a destination address to the packet.

3. The UT of claim 1, further comprising a forward link receiver to receive information from the satellite gateway, wherein the information comprises the preamble, a beam center frequency offset, guidance for a transmission mode, and a waveform repeat count.

4. The UT of claim 1, further comprising a forward link receiver to receive information from the satellite gateway, wherein the information comprises a reference RSRP, a beam center Doppler, a beam center TA, guidance for a transmission mode per the reference RSRP.

5. The UT of claim 1, further comprising a GNSS to produce a location for the UT, wherein the frequency synchronizer compensates for a Doppler shift based on doppler frequency measurement from GNSS.

6. The UT of claim 1, further comprising a NB-IoT hub to operate as a standard NB-IoT base for a standard NB-IoT device, to receive and packetize a standard NB-IoT waveform from the standard NB-IoT device, and to send the packetized communication via the ASCMA transmitter to the satellite gateway.

7. The UT of claim 6, further comprising a forward link receiver to receive information from the satellite gateway, to packetize the information from the satellite gateway, and to send the packetized information via the standard NB-IoT base to the standard NB-IoT device as a standard NB-IoT waveform.

8. The UT of claim 1, further comprising a short-range transceiver to communicate with a local device.

9. The UT of claim 1, further comprising a short-range transceiver to receive initialization and configuration information for communicating over the ASCMA return link.

10. A method for transmitting small amounts of data from a User Terminal (UT), the method comprising:
providing a packet comprising the data, wherein the packet is less than 128 bytes;
synchronizing a transmission frequency of an Asynchronous Scrambled Coded Multiple Access (ASCMA) return link connecting the UT with a satellite gateway; and
transmitting, without acquiring timing synchronization with the satellite gateway from the UT, the packet modulated over the synchronized transmission frequency as an ASCMA waveform comprising a preamble to indicate a start of a transmission.

11. The method of claim 10, further comprising packetizing the data for transmission to the satellite gateway by adding a destination address to the packet, wherein the data is produced by a sensor.

12. The method of claim 10, further comprising compensating for a Doppler shift in the ASCMA return link based on doppler frequency measurement from GNSS.

13. The method of claim 10, further comprising receiving information from the satellite gateway, wherein the information comprises the preamble, a beam center frequency offset, guidance for a transmission mode, and a waveform repeat count.

14. The method of claim 10, further comprising:
receiving a communication as an NB-IoT waveform, wherein the communication comprises the data and a destination address; and
packetizing the data and the destination address, wherein the transmitting sends the packetized communication as the ASCMA waveform.

15. The method of claim 14, further comprising:
receiving information from the satellite gateway;
packetizing the information from the satellite gateway; and
sending the packetized information via an NB-IoT base as a standard NB-IoT waveform.

16. A system to transmit small amounts of data, the system comprising:
a satellite gateway; and
a plurality of User Terminals (UTs), each UT comprising:
a packet comprising the data, wherein the packet is less than 128 bytes,
a frequency synchronizer to synchronize a transmission frequency of an Asynchronous Scrambled Coded Multiple Access (ASCMA) return link connecting the UT with the satellite gateway, and
an ASCMA transmitter to transmit, without acquiring timing synchronization with the satellite gateway from the UT, the packet modulated over the synchronized transmission frequency as an ASCMA waveform comprising a preamble to indicate a start of a transmission,
wherein
the satellite gateway is configured to receive at least two of the transmissions,
the at least two of the transmissions are received by the satellite gateway at least partially concurrently, and
the satellite gateway is configured to separate each of the at least two of the transmissions and to recover the respective packet from each of the at least two of the transmissions.

17. The system of claim 16, wherein the packet comprises a destination address, and the satellite gateway is configured to extract the destination address from the respective packet and forward the data in the packet to the destination address.

18. The system of claim 16, further comprising a reference UT in a coverage area of the ASCMA return link, wherein the reference UT reports to the satellite gateway a reference RSRP, a beam center Doppler and a beam center TA.

19. The system of claim 17, wherein the satellite gateway determines guidance for a transmission mode of the UTs in the coverage area per the reference RSRP.

20. The system of claim 17, wherein the satellite gateway provides, to the plurality of UTs, initialization and configuration information for communicating over the ASCMA return link.

* * * * *